US012561447B2

(12) United States Patent
Gorelik et al.

(10) Patent No.: US 12,561,447 B2
(45) Date of Patent: Feb. 24, 2026

(54) CONTINUOUS VULNERABILITY ASSESSMENT SYSTEM

(71) Applicant: MORPHISEC INFORMATION SECURITY 2014 LTD., Beer-Sheva (IL)

(72) Inventors: Michael Gorelik, Alpine, NJ (US); Dorel Yaffe, Kiryat Gat (IL)

(73) Assignee: MORPHISEC INFORMATION SECURITY 2014 LTD., Beer Sheva (IL)

( * ) Notice: Subject to any disclaimer, the term of this patent is extended or adjusted under 35 U.S.C. 154(b) by 70 days.

(21) Appl. No.: 18/686,224

(22) PCT Filed: Aug. 15, 2022

(86) PCT No.: PCT/IB2022/057634
§ 371 (c)(1),
(2) Date: Feb. 23, 2024

(87) PCT Pub. No.: WO2023/026132
PCT Pub. Date: Mar. 2, 2023

(65) Prior Publication Data
US 2024/0394379 A1 Nov. 28, 2024

Related U.S. Application Data

(60) Provisional application No. 63/237,032, filed on Aug. 25, 2021.

(51) Int. Cl.
*G06F 21/57* (2013.01)

(52) U.S. Cl.
CPC ................................. *G06F 21/577* (2013.01)

(58) Field of Classification Search
CPC ................................................... G06F 21/577
(Continued)

(56) References Cited

U.S. PATENT DOCUMENTS 7,325,252 B2 1/2008 Bunker, V
7,451,488 B2 11/2008 Cooper
(Continued)

FOREIGN PATENT DOCUMENTS

WO WO2023026132 A1 3/2023

OTHER PUBLICATIONS

International Search Report and Written Opinion for International Application No. PCT/IB2022/057634, European Patent Office, Munich, mailed on Feb. 12, 2022, 10 pages.
(Continued)

*Primary Examiner* — Benjamin R Bruckart
(74) *Attorney, Agent, or Firm* — Sterne, Kessler, Goldstein & Fox P.L.L.C.

(57) ABSTRACT

The embodiments disclosed herein are directed to a continuous vulnerability assessment system for detecting exploitable vulnerabilities. For example, an agent executes on a plurality of computing devices. Each agent profiles various pieces of software executing on its respective device and obtains various characteristics thereof. For instance, each agent determines, among other things, the length of time certain software executes on the device. Each agent provides descriptors of the determined characteristics to a vulnerability assessment engine. The engine determines a cumulative length of time that each particular piece of software executed across the plurality of computing devices. The engine also determines whether a vulnerability exists with respect to each particular piece of software, assigns a security risk level for the software based at least on the determined vulnerability and the cumulative length of time, and performs an action to mitigate the determined vulnerability based on the security risk level.

20 Claims, 8 Drawing Sheets

(58) Field of Classification Search
USPC .......................................................... 726/25
See application file for complete search history.

(56) References Cited

U.S. PATENT DOCUMENTS

| | | | | |
|---|---|---|---|---|
| 8,181,173 | B2 | 5/2012 | Childress | |
| 8,789,195 | B2 | 7/2014 | Bianco | |
| 8,850,512 | B2 * | 9/2014 | Price | G06F 21/577 |
| | | | | 718/1 |
| 8,938,803 | B1 * | 1/2015 | Roberts | H04L 63/1408 |
| | | | | 726/20 |
| 10,599,850 | B1 * | 3/2020 | Loihl | G06F 21/562 |
| 10,860,369 | B2 * | 12/2020 | Du | G06F 9/4881 |
| 2009/0178142 | A1 * | 7/2009 | Lieblich | G06F 21/316 |
| | | | | 726/25 |
| 2009/0293121 | A1 | 11/2009 | Bigus | |
| 2013/0275581 | A1 * | 10/2013 | Yu | H04L 67/535 |
| | | | | 709/224 |
| 2014/0237599 | A1 * | 8/2014 | Gertner | H04L 63/1425 |
| | | | | 726/24 |

OTHER PUBLICATIONS

Patil, Rajendra, and Chirag Modi. "Designing an efficient framework for vulnerability assessment and patching (VAP) in virtual environment of cloud computing." The Journal of Supercomputing 75.5 (2019): 2862-2889.

Du, Xiaoning, et al. "Leopard: Identifying vulnerable code for vulnerability assessment through program metrics." 2019 IEEE/ACM 41st International Conference on Software Engineering (ICSE). IEEE, 2019.

Farris, Katheryn A., et al. "Vulcon: A system for vulnerability prioritization, mitigation, and management." ACM Transactions on Privacy and Security (TOPS) 21.4 (2018): 1-28.

Cukier, Michel, and Susmit Panjwani. "Prioritizing vulnerability remediation by determining attacker-targeted vulnerabilities." IEEE Security & Privacy 7.1 (2009): 42-48.

Jacobs, Jay, et al. "Exploit prediction scoring system (EPSS)." arXiv preprint arXiv:1908.04856 (2019).

Jacobs, Jay, et al. "Improving vulnerability remediation through better exploit prediction." Journal of Cybersecurity 6.1 (2020).

* cited by examiner

APPLICATION INVENTORY ( View Action List )

Showing 10 out of 25 applications

| Name | Version | # Installed | Running | Vulnerabilities | CVSS | Patch | Priority |
|------|---------|-------------|---------|-----------------|------|-------|----------|
| App 1 | 1.3.12.5 | 526 | 100 | 6 | 9 | ✓ | 1 |
| App 2 | 1.4.6.3.1 | 526 | 100 | 3 | 9 | ✓ | 2 |
| App 3 | 12.2.1 | 498 | 100 | 2 | 9 | ✓ | 3 |
| App 4 | 3.1 | 453 | 100 | 6 | 9 | ✓ | 4 |
| App 5 | 3.1 | 384 | 100 | 4 | 9 | ✓ | 5 |
| App 1 | 1.3.12.2 | 284 | 100 | 3 | 9 | ✓ | 6 |
| App 2 | 1.4.5 | 384 | 100 | 2 | 9 | ✓ | 7 |
| App 3 | 12.2.2 | 384 | 100 | 6 | 7 | ✓ | 8 |
| App 4 | 3.2 | 384 | 100 | 7 | 7 | ✓ | 9 |
| App 5 | 3.2 | 384 | 100 | 1 | 7 | ✓ | 10 |

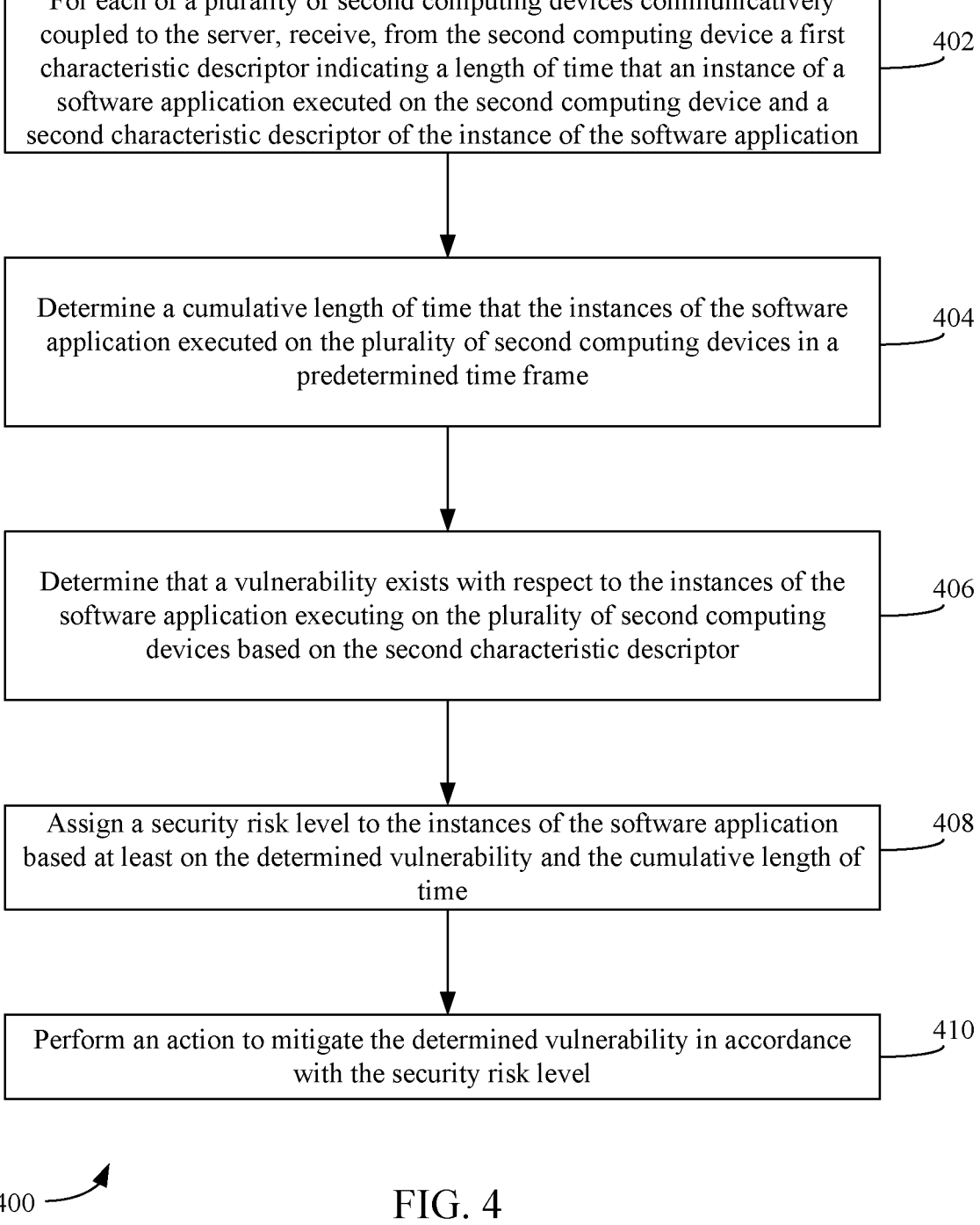

For each of a plurality of second computing devices communicatively coupled to the server, receive, from the second computing device a first characteristic descriptor indicating a length of time that an instance of a software application executed on the second computing device and a second characteristic descriptor of the instance of the software application          402

Determine a cumulative length of time that the instances of the software application executed on the plurality of second computing devices in a predetermined time frame          404

Determine that a vulnerability exists with respect to the instances of the software application executing on the plurality of second computing devices based on the second characteristic descriptor          406

Assign a security risk level to the instances of the software application based at least on the determined vulnerability and the cumulative length of time          408

Perform an action to mitigate the determined vulnerability in accordance with the security risk level          410

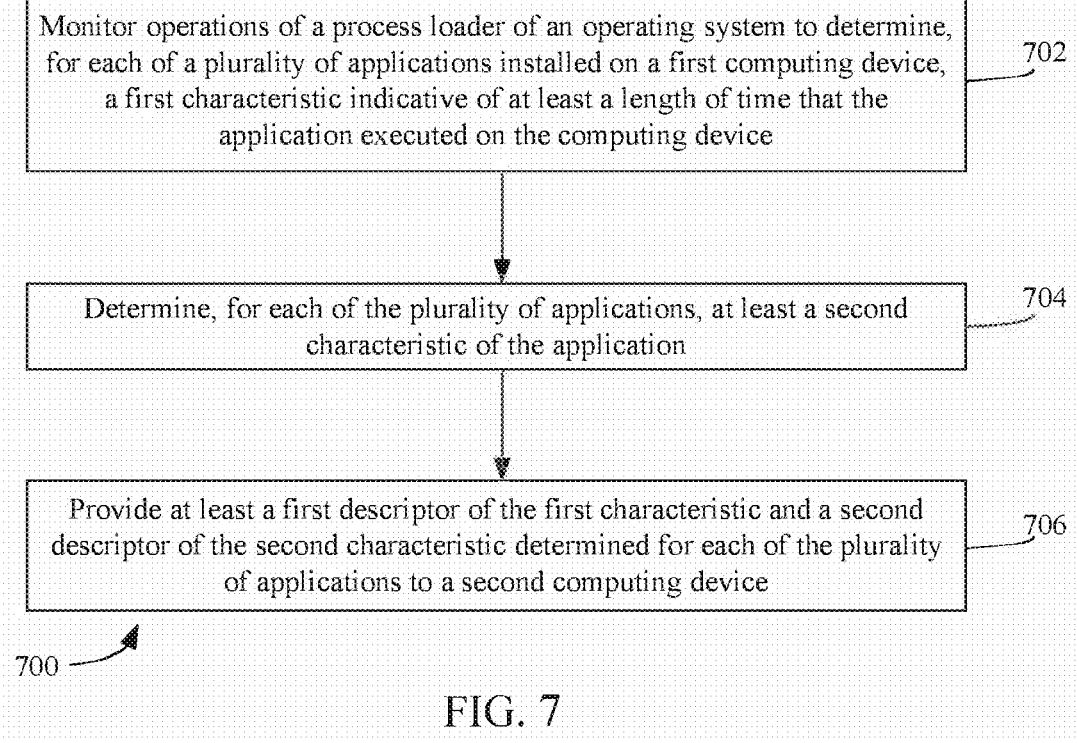

Monitor operations of a process loader of an operating system to determine, for each of a plurality of applications installed on a first computing device, a first characteristic indicative of at least a length of time that the application executed on the computing device          702

Determine, for each of the plurality of applications, at least a second characteristic of the application          704

Provide at least a first descriptor of the first characteristic and a second descriptor of the second characteristic determined for each of the plurality of applications to a second computing device          706

CONTINUOUS VULNERABILITY ASSESSMENT SYSTEM

BACKGROUND

Security experts discover new software bugs and security vulnerabilities and release new bug or vulnerability reports every day. Increasingly, organizations find remediating all vulnerabilities and bugs in a timely and cost-effect manner to be difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to a continuous vulnerability assessment system for detecting vulnerabilities that can be exploited by malware. For example, an agent executes on a plurality of computing devices. Each agent profiles various pieces of software executing on its respective computing device and obtains various characteristics thereof. For instance, each agent determines, among other things, the length of time certain software executes on the computing device. Each agent provides descriptors of the determined characteristics to a vulnerability assessment engine. The vulnerability assessment engine determines a cumulative length of time that each particular piece of software executed across the plurality of computing devices. The vulnerability assessment engine also determines whether a vulnerability exists with respect to each particular piece of software and assigns a security risk level for the software based at least on the determined vulnerability and the cumulative length of time. The vulnerability assessment engine may also perform an action to mitigate the determined vulnerability in accordance with the security risk level.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 depicts an example graphical user interface of a vulnerability assessment engine in accordance with another example embodiment.

FIG. 4 depicts a flowchart of an example method performed by a computing device for continuously assessing vulnerabilities in a system in accordance with an example embodiment.

FIG. 7 depicts a flowchart of an example method performed by an agent of a computing device for determining various characteristics of one or more applications that executed on a computing device in accordance with an example embodiment.

Figure 1:
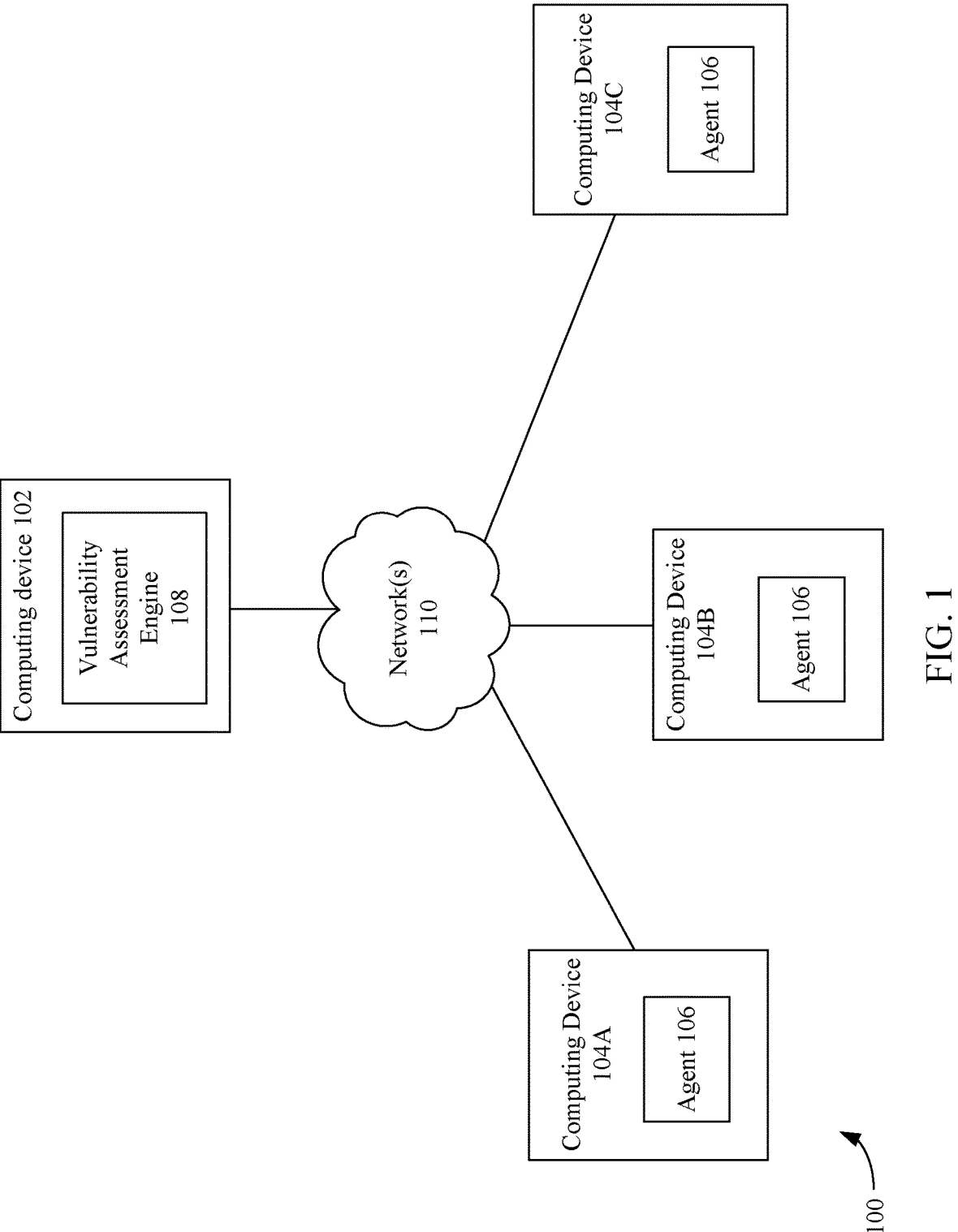
FIG. 1 is a block diagram of a system configured to continuously assess vulnerabilities that are exploitable by malware in accordance with an example embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

The embodiments disclosed herein are directed to a continuous vulnerability assessment system for detecting vulnerabilities that can be exploited by malware. For example, an agent executes on a plurality of computing devices. Each agent profiles various pieces of software executing on its respective computing device and obtains various characteristics thereof. For instance, each agent determines, among other things, the length of time certain software executes on the computing device. Each agent provides descriptors of the determined characteristics to a vulnerability assessment engine. The vulnerability assessment engine determines a cumulative length of time that each particular piece of software executed across the plurality of computing devices. The vulnerability assessment engine also determines whether a vulnerability exists with respect to each particular piece of software and assigns a security risk level for the software based at least on the determined vulnerability and the cumulative length of time. The vulnerability assessment engine may also perform an action to mitigate the determined vulnerability in accordance with the security risk level.

The embodiments described herein also provide a clear and easy prioritization (priority to patch) score based on a set of factors that include both the severity of the vulnerability and user analytics indicators indicative of a usage pattern for vulnerable software cross-organization.

The embodiments described herein advantageously identify and prioritize vulnerabilities, thereby focusing mitigation efforts to ensure that the most severe vulnerabilities are resolved first. Accordingly, the embodiments described herein provide improvements in other technologies, namely data security. By enabling the most severe vulnerabilities to be mitigated first, certain exploits, for example, that attempt to access personal and/or confidential information and/or access network and computing entities (e.g., computing devices, virtual machine, etc.) may be quickly resolved, thereby preventing access to such information and computing entities. In addition, by mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

Embodiments may be implemented in a variety of systems. For instance, FIG. 1 is a block diagram of a system 100 configured to continuously assess vulnerabilities that are exploitable by malware in accordance with an example embodiment. As shown in FIG. 1, system 100 comprises a first computing device 102 and a plurality of second computing devices 104A-104C. Computing device 102 and computing devices 104A-104C are communicatively coupled via one or more networks 110. Computing device 102 may be implemented via a physical computing device (e.g., a workstation, a server, etc.), a virtual machine executing on a physical computing device, and/or any type of device comprising one or more processors and/or memories that is configured to process data. In accordance with an embodiment, computing device 102 may be one of many servers included in a cloud-based environment. Examples of computing devices 104A-104C include, but are not limited to, any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), or a stationary computing device such as a desktop computer or PC (personal computer) or a server. Examples of network(s) 110 include, but are not limited to, include, local area networks (LANs), wide area networks (WANs), enterprise networks, the Internet, etc., and may include one or more of wired and/or wireless portions. It is noted that while three computing devices 104A-104C are shown in system 100 of FIG. 1, system 100 may comprise any number of computing devices.

Each of computing devices 104A-104C is configured to execute an agent 106. Agent 106 may be configured to determine various characteristics of active software executing on its respective computing device of computing devices 104A-104C (rather than merely determining characteristics of software (or software objects) installed on its computing device). Examples of software include, but are not limited to, applications (and/or components thereof, e.g., application plug-ins, application add-ons, dynamic linked libraries, third-party libraries, modules, etc.)), operating systems, services (e.g., remote desktop services, firewall services, etc.), etc. Examples of characteristics include but are not limited to, how frequent the software is being utilized on a respective computing device, how long the software is being run (or executed) on a respective computing device, settings of the software, execution domain and local privileges associated with the software, whether the software is public-facing (i.e., accessible via a network and/or the Internet), whether a respective computing device is managed or unmanaged (e.g., whether or not the computing device is part of a managed domain), etc. Each agent 106 provides descriptors (e.g., information that identifies and/or describes) of such characteristics to computing device 102, along with additional information (or descriptors of additional characteristics). The additional information includes, but is not limited to, an identifier of each piece of software being profiled (e.g., one or more properties of each piece of software, including, but not limited to, a name and/or version each piece of software, a hash representative of each piece of software, and/or any information that uniquely identifies each piece of software), an identifier of the computing device for which the characteristics were collected, an identifier of the type of computing device (e.g., a server, a workstation, etc.) for which the characteristics were collected, etc.

In accordance with an embodiment, at least some of the characteristics of a respective computing device of computing devices 104A-104C may be determined by monitoring a process loader executing on the computing device. The process loader is configured to initiate creation of a computing process in main memory of the respective computing device. The process is an instance of a software program (e.g., applications (and/or components thereof), operating systems, services, etc.) being executed by processor(s) of the computing device. Agent 106 may be configured to monitor the process loader to determine when processes are loaded into memory, thereby indicating the initiation of execution of particular software. Agent 106 may also monitor when processes are terminated, thereby indicating the end of execution of the particular software. Agent 106 may determine the length of the software's run time based on the foregoing monitoring techniques. Agent 106 may also determine the frequency of a particular software's usage in a given time frame (e.g., per day, per week, per month, or any other periodic time frame) based on the number of times the software is loaded into main memory.

Agent 106 may also profile a particular piece of software to determine the settings thereof. For instance, agent 106 may query a registry of the operating system installed on its computing device, which returns settings for the software. Alternatively, agent 106 may query the software directly for their respective configuration settings, for example, via an application programming interface (API) exposed by the software. Examples of settings include, but are not limited to, network settings, firewall settings, administrative settings, encryption settings, etc. For instance, agent 106 may determine whether a firewall application or service is activated or deactivated. In another example, agent 106 may determine whether a particular network protocol (of an operating system, an application or a service) that is exploitable via malware is activated (e.g., a server message block (SMB) version 1 protocol). In yet another example, agent 106 may determine whether an operating system enables execution of an application installed on an external storage device (e.g., a universal serial bus (USB) drive). In a further example, agent 106 may determine whether network level authentication is activated for a particular application, e.g., a remote desktop protocol (RDP) application. In another example, agent 106 may determine whether encryption is enabled with respect to certain storage devices included in its respective computing device. In a further example, agent 106 may determine a permission level set for an active and executing user access control mechanism of an operating system.

Each agent 106 may continuously monitor its respective computing device of computing devices 104A-104C to determine which pieces of software are active and executing on the particular computing device at any given time and to determine characteristics for such software. This way, all pieces of software that execute on the particular computing device are eventually profiled even though each piece may not necessarily execute at the same time. Each agent 106 may periodically provide descriptors of the determined characteristics to computing device 102. For instance, agent 106 may provide the descriptors of the determined characteristics to computing device 102 on an hourly basis, a daily basis, a weekly basis, and/or in accordance with any other periodic time frame.

As shown in FIG. 1, computing device 102 comprises a vulnerability assessment engine 108. Vulnerability assessment engine 108 is configured to receive descriptors of characteristics and/or other information from agents 106 executing on computing devices 104A-104C. In accordance with an embodiment, each agent 106 provides the descriptors of characteristics and/or other information periodically to vulnerability assessment engine 108, as described above. In accordance with another embodiment, vulnerability assessment engine 108 requests the characteristics and/or other information from each of agent 106. Vulnerability assessment engine 108 analyzes the characteristics received from each agent 106 and determines user analytics indicators indicative of a usage pattern for each profiled piece of software across computing device 104A-104C. The user analytics indicators for a given piece of software include, but are not limited to, how many computing devices of computing devices 104A-104C are utilizing the software, how frequent the software is being used collectively across computing devices 104A-104C, how long the software is being executing collectively across computing devices 104A-104C, the types of computing devices and/or the number thereof that utilize the software, the types of users (e.g., administrators, non-administrators, etc.) and/or number thereof that utilize the software.

Based on the user analytics indicators and/or usage patterns, vulnerability assessment engine 108 determines a risk level for both known and unknown vulnerabilities of software installed on computing devices 104A-104C. To determine a risk level for known vulnerabilities, vulnerability assessment engine 108 may provide identifiers and/or settings of software profiled by each agent 106 to a vulnerability score database. In response, the vulnerability score database may provide a vulnerability score for the identified software and/or settings thereof. Examples of a vulnerability score database, include, but are not limited to, a Common Vulnerability Scoring System (CVSS)-based vulnerability score database, a Common Weakness Scoring System (CWSS)-based vulnerability score database, etc.

Vulnerability assessment engine 108 may also determine an exploitability score for the identified software and/or settings thereof. For instance, vulnerability assessment engine 108 may determine known exploits for the various pieces of software profiled by each agent 106. Vulnerability assessment engine 108 may determine the exploits via an exploitability knowledge base, which may comprise one or more databases comprising an archive of known exploits for various pieces of software. Examples of an exploitability knowledge base includes, but is not limited to, ExploitDB, GitHub, etc.

After determining the vulnerability score and/or known exploits for a piece of software, vulnerability assessment engine 108 may determine the risk level based on the vulnerability score, the known exploits, and/or the characteristics obtained for the software from each agent 106. For example, the risk level for a particular piece of software may be determined in accordance with Equations 1-3, which are shown below:

$$\text{Usage Number} = \left(\frac{\text{Sum of } Uptime}{\text{Max}Usage}\right) * 100 \qquad \text{(Equation 1)}$$

$$\text{Max}Usage = tenantMachineCount * TimePeriod \qquad \text{(Equation 2)}$$

$$\text{Risk Level} = \qquad\qquad\qquad\qquad\qquad\qquad\qquad \text{(Equation 3)}$$
$$(w1 * \text{Max}VulnerabilityScore) + \left(w2 * \left(\frac{\text{Usage Number}}{10}\right)\right)$$

In accordance with Equations 1-3, the Sum of Uptime corresponds to the cumulative amount of time that a particular piece of software executed across computing devices 104A-104C, tenantMachineCount corresponds to the total number of computing devices (e.g., computing devices 104A-104C) being profiled in an organization, MaxVulnerabilityScore corresponds to the highest vulnerability score determined for the particular piece of software, w1 corresponds to a first weight value, w2 corresponds to a second weight value, and TimePeriod corresponds to a time period being monitored, for example, measured in seconds.

In accordance with an embodiment, the value of w1 is 0.85, the value of w2 is 0.15, and the value of TimePeriod is 18,000 (i.e., the number of seconds in 5 hours); although, it is noted that the embodiments described herein are not so limited. In accordance with such an embodiment, suppose that the MaxUsage is equal to 180,000 seconds (i.e., tenantMachine Count is equal to 10) and Sum of Uptime is equal to 10,000 seconds. In this example, Usage Number is equal to approximately 5.55. Further suppose that MaxVulnerabilityScore is 9.0. Accordingly, Risk Level would be approximately 7.73, which is a relatively high risk level (e.g., using a scale from 0-10, where higher the number, higher the risk).

It is noted that that the risk level determination techniques described above with reference to Equations 1-3 are purely exemplary and that other techniques may be utilized. For instance, the determined risk level may also be based on other determined characteristics described herein (e.g., types of computing devices on which the application executes, the types of users utilizing the application, the frequency at which the software is being utilized, settings of the software, execution domain and local privileges associated with the software, whether the software is public-facing, whether a respective computing device is managed or unmanaged etc. For instance, Equation 3 may be modified to factor in these additional characteristics, where one or more of such characteristics is weighted in accordance with a respective weight value.

In accordance with an embodiment, Risk Level may be normalized across a week with a weighted average to support certain scenarios (e.g., where an information technology (IT) administrator removed a vulnerable piece of software, and/or so that an administrative team can identity rarely-used licenses of software and free them up). For example, suppose the present day is a Tuesday. In accordance with such an example, Risk Level determined for Tuesday may be normalized as follows, $$\text{Tuesday Risk Level} = (\text{Monday} * w1) + (\text{Friday} * w2) + \qquad \text{(Equation 4)}$$
$$(\text{Thursday} * w3) + (\text{Wednesday} * w4) + (\text{Tuesday} * w5)$$

where Monday corresponds to the risk level determined for the last Monday, Friday corresponds to the risk level determined for the last Friday, Thursday corresponds to the risk level determined for the last Thursday, Wednesday corresponds to the risk level determined for the last Wednesday, and Tuesday corresponds to the risk level determined for the last Tuesday (i.e., a week before the present Tuesday). w1 corresponds to a first weight value, w2 corresponds to a second weight value, w3 corresponds to a third weight value, w4 corresponds to a fourth weight value, and w5 corresponds to a fifth weight value. In accordance with an embodiment, w1 is equal to 5/15, w2 is equal to 4/15, w3 is equal to 3/15, w4 is equal to 2/15, and w5 is equal to 1/15. The foregoing will result in a moving average with the most weight being placed on the latest working day. It is noted that normalizing Risk Level across a week via a moving average, as described above, is just one example technique, and that Risk Level may be averaged utilized different techniques (e.g., by taking the equal average to better represent workloads (based on the environment in which agents 106 execute)) or may not be averaged at all.

Vulnerability assessment engine 108 may determine risk levels for unknown vulnerabilities (e.g., vulnerabilities that have not been scored (e.g., via a CVSS database)) based on an analysis of the settings determined for applications and provided by each agent 106. For instance, vulnerability assessment engine 108 may determine that the compute environment in which computing devices 104A-104C is not secure if the majority of computing devices 104A-104C do not have a firewall enabled, have encryption disabled, have certain network protocols prone to exploitation enabled, etc.

Figure 2:
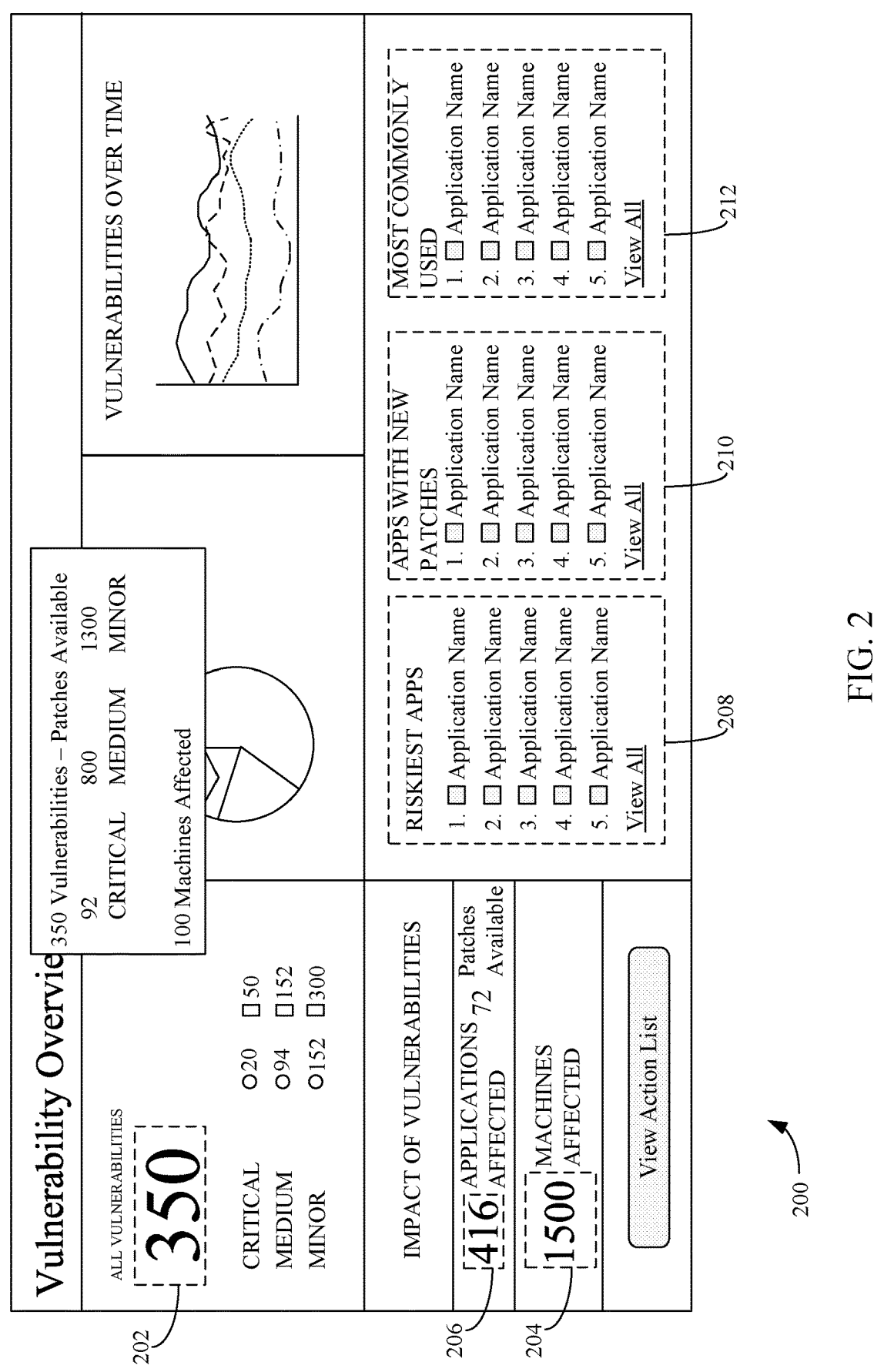
FIG. 2 depicts an example graphical user interface of a vulnerability assessment engine in accordance with an example embodiment.

After determining the risk level for different pieces of software (and assigning them thereto) that execute on each of computing device 104A-104C, vulnerability assessment engine 108 may rank the risk levels. For instance, vulnerability assessment engine 108 may sort the risk levels from greatest to least and present the risk levels to a user of via a graphical user interface of vulnerability assessment engine 108. For example, FIG. 2 depicts an example graphical user interface 200 of vulnerability assessment engine 108 that may be displayed to a user in accordance with an example embodiment. As shown in FIG. 2, graphical user interface 200 may display a number 202 and/or listing of all the vulnerabilities detected across computing devices 104A-104C, a number 204 and/or listing of all the computing devices of computing devices 104A-104C affected by vulnerabilities, a number 206 and/or listing of all the pieces of software affected by vulnerabilities, etc. Graphical user interface 200 may also display a ranking 208 of pieces of software in terms of risk level, a listing 210 of pieces of software for which patches are available, and/or a ranking 212 of pieces of software in terms of their usage. Graphical user interface 200 may provide additional graphical user interface screens that display details with regards to each vulnerable piece of software. For example, FIG. 3 depicts an example graphical user interface 300 of vulnerability assessment engine 108, which displays details regards to each affected piece of software in accordance with an example embodiment. The details include, but are not limited to, the name of each piece of software, a version of each piece of software, the number of instances installed across computing devices 104A-104C, a length of time that the instances have been running across computing devices 104A-104C, a number of vulnerabilities associated with each piece of software, a vulnerability score associated with each piece of software, a status of whether or not the piece of software has been patched, a prioritized risk level associated with each piece of software, etc.

It is noted that the determined risk levels may evolve and change over time as more and more characteristics are periodically provided by each agent 106. This way, the risk levels are tailored towards the specific software usage across an organization in which vulnerability assessment engine 108 is utilized.

In accordance with an embodiment, vulnerability assessment engine 108 is configured to patch the detected vulnerabilities. For instance, vulnerability assessment engine 108 may be configured to provide an option for a user to implement a patch (e.g., via a graphical user interface). Responsive to receiving user input that indicates that a patch is to be implemented, vulnerability assessment engine 108 may perform the patch. Alternatively, vulnerability assessment engine 108 may automatically perform the patch. In accordance with another embodiment, vulnerability assessment engine 108 may export the data collected and/or determined thereby (as described herein) to a third-party information technology (IT) patch management program, which performs the patching.

It is noted vulnerabilities, as described herein, are not limited to security flaws, for example, as defined by Common Vulnerabilities and Exposures (CVE). Vulnerabilities also include security flows that result due to device and/or software misconfiguration and all the security flaws that present an attack surface that can be utilized by a malicious entity to penetrate/infiltrate/propagate/escalate or execute within the computer domain.

Figure 5:
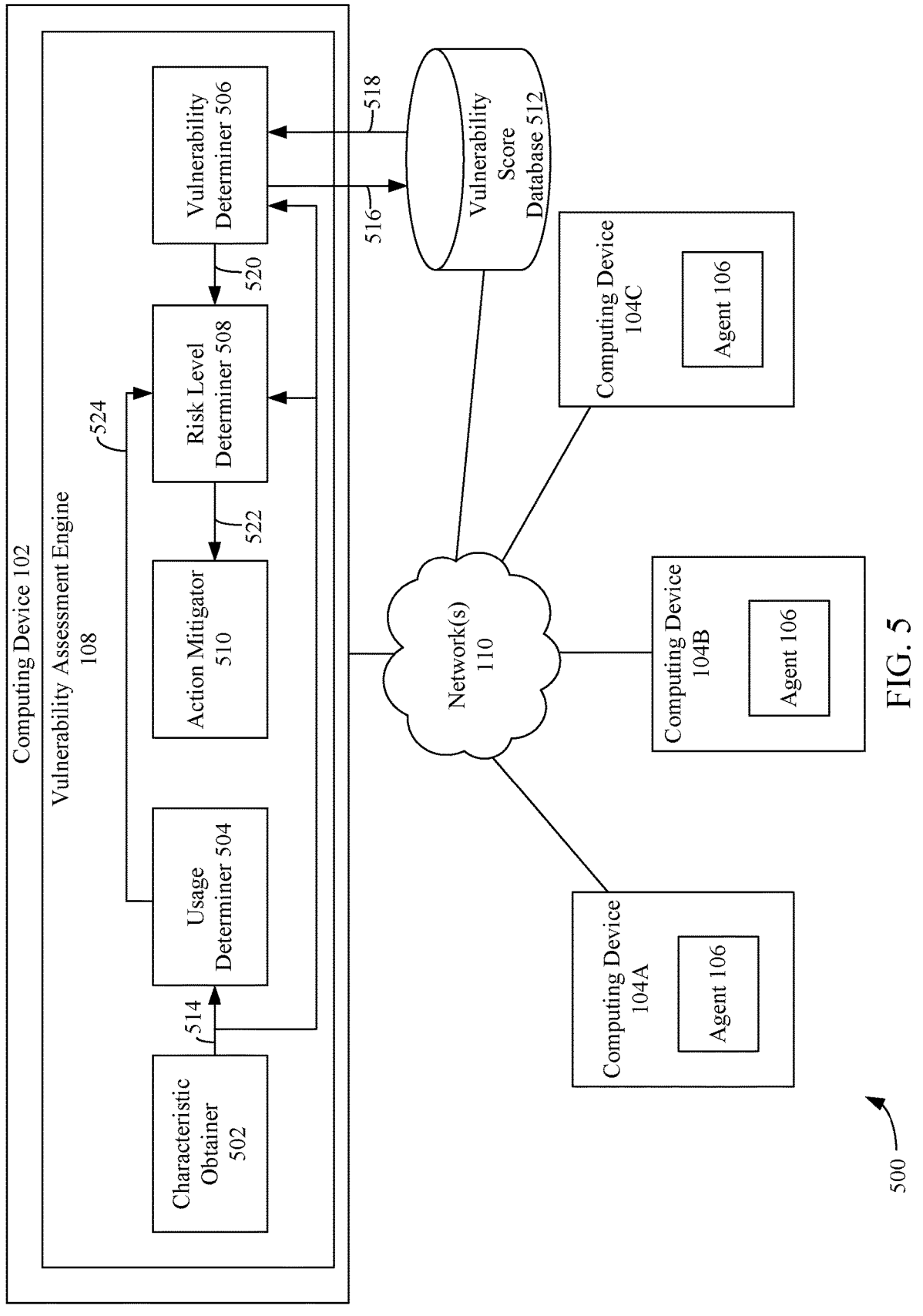
FIG. 5 depicts a block diagram of system for continuously assessing vulnerabilities in a system in accordance with an example embodiment.

Accordingly, vulnerabilities in a system may be continuously assessed in various ways. For example, FIG. 4 depicts a flowchart 400 of an example method performed by a computing device for continuously assessing vulnerabilities in a system in accordance with an example embodiment. In an embodiment, flowchart 400 may be implemented by a system 500 of FIG. 5. FIG. 5 depicts a block diagram of system 500 for continuously assessing vulnerabilities in a system in accordance with an example embodiment. As shown in FIG. 5, system 500 comprises computing device 102, computing devices 104A-104C, and a vulnerability score database 512, each of which are communicatively coupled to network(s) 110. Vulnerability score database 512 stores a listing of vulnerability scores for various pieces of software. In accordance with an embodiment, the vulnerability scores are in accordance with the common vulnerability scoring system (CVSS); although it is noted that the embodiments described herein are not so limited. As also shown in FIG. 5, computing device 102 comprises vulnerability assessment engine 108, as described above with reference to FIG. 1. Vulnerability assessment engine 108 comprises a characteristic obtainer 502, a usage determiner 504, a vulnerability determiner 506, a risk level determiner 508, and an action mitigator 510. The method of flowchart 400 will be described with reference to system 500 of FIG. 5, although the method is not limited to that implementation. Other structural and operational embodiments will be apparent to persons skilled in the relevant art(s) based on the discussion regarding flowchart 400 and system 500 of FIG. 5.

As shown in FIG. 4, the method of flowchart 400 begins at step 402. At step 402, for each of a plurality of second computing devices communicatively coupled to the first computing device, a first characteristic descriptor indicating a length of time that an instance of a software application executed on the second computing device and a second characteristic descriptor of the instance of the software application is received from the second computing device. For example, with reference to FIG. 5, characteristic obtainer 502 obtains, from each of second computing devices 104A-104C, a first characteristic descriptor indicating a length of time that an instance of a software application executed on the second computing device and a second characteristic descriptor of the instance of the software application is received from the second computing device. The obtained characteristic(s) (shown as characteristic(s) 514) are provided to usage determiner 504, vulnerability determiner 506, and risk level determiner 508.

In accordance with one or more embodiments, the second characteristic descriptor of the instance of the software application specifies one or more properties of the instance of the application. For example, with reference to FIG. 5, characteristic descriptor(s) 514 specify one or more properties (e.g., name, version number, a hash representative thereof, etc.) of the instance of the software application.

In accordance with one or more embodiments, for each of the plurality of second computing devices, a third characteristic descriptor specifying one or more configuration settings of the instance of the software application is received from the second computing device. For example, with reference to FIG. 5, characteristic descriptor(s) 514 specify one or more configuration settings of the instance of the software application.

In accordance with one or more embodiments, the one or more configuration settings comprise at least one of one or more network settings of the instance of the software application, one or more firewall settings of the instance of the software application, one or more administrative settings of the instance of the software application, or one or more encryption settings of the instance of the software application.

At step 404, a cumulative length of time that the instances of the software application executed on the plurality of second computing devices in a predetermined time frame is determined. For example, with reference to FIG. 5, usage determiner 504 determines a cumulative length of time 524 that the instances of the software application executed on second computing devices 104A-104C. For instance, usage determiner 504 may add the lengths of time that instances of the software application executed on second computing devices 104A-104C in a predetermined time frame (e.g., one day, one week, one month, etc.). It is noted that in embodiments usage determiner 504 may determine the cumulative length of time that instances of different software applications executed on second computing devices 104A-104C. In accordance with such embodiments, to determine the cumulative length of time that a particular software application executed across second computing devices 104A-104C, usage determiner 504 adds the obtained lengths of time that are associated with an identifier of the software application obtained from agent(s) 106 of second computing devices 104A-104C.

At step 406, a determination is made that a vulnerability exists with respect to the instances of the software application executing on the plurality of second computing devices based on the second characteristic descriptor. For example, with reference to FIG. 5, vulnerability determiner 506 determines that a vulnerability exists with respect to the instances of the software application executing on second computing devices 104A-104C based on characteristic descriptor(s) 514.

In accordance with one or more embodiments, determining that the vulnerability exists with respect to the instances of the software application executing on the plurality of second computing devices based on the second characteristic descriptor comprises providing a query specifying the second characteristic descriptor to a vulnerability score database, receiving a response specifying a vulnerability score for the instances of the software application, and determining that the vulnerability exists responsive to the vulnerability score having a predetermined relationship with a predetermined threshold. For example, with reference to FIG. 5, vulnerability determiner 506 provides a query 516 specifying the second characteristic descriptor (e.g., the properties of the instances of the software application) to vulnerability score database 512. Vulnerability score database 512 determines the vulnerability score for the instance of the software application based on the query and returns a response 518 comprising the vulnerability score to vulnerability 506. Vulnerability determiner 506 determines that the vulnerability exists responsive to the vulnerability score having a predetermined relationship with a predetermined threshold (e.g., the vulnerability score is less than, less than or equal to, greater than, or greater than or equal to) a predetermined vulnerability score (e.g., 1.0, 4.0, 7.0, etc.). Vulnerability determiner 506 provides the vulnerability score (shown as vulnerability score 520) to risk level determiner 508.

At step 408, a security risk level is assigned to the instances of the software application based at least on the determined vulnerability and the cumulative length of time. For example, with reference to FIG. 5, vulnerability assessment engine 108 assigns a security risk level to the instances of the application executing on second computing device(s) 104A-104C based at least on the determined vulnerability and cumulative length of time 524. In accordance with an embodiment, the risk level is determined in accordance with Equations 1-3, as described above. The generated risk level (shown as risk level 522) is provided to action mitigator 510.

In accordance with one or more embodiments, the security risk level is assigned further based on at least one of a number of the plurality of second computing devices on which the instances of the software application executed, a frequency at which the instances of the software application is executed on the plurality of second computing devices, a device type of each of the plurality of second computing devices, or a type of a user of each of the plurality of second computing devices. For example, with reference to FIG. 5, the security risk level is assigned further based on at least one of a number of second computing devices 104A-104C on which the instances of the software application executed, a frequency at which the instances of the software application is executed on second computing devices 104A-104C (hourly, daily, weekly, etc.), a device type (e.g., a server, a workstation) of each of second computing devices 104A-104C, or a type of a user (e.g., administrators, non-administrators, etc.) of each of second computing devices 104A-104C. It is noted that such factors may be examples of characteristics specified by characteristic descriptor(s) 514 obtained from second computing devices 104A-104C.

In accordance with one or more embodiments, the security risk level is assigned further based on the one or more configuration settings of the instances of the software application. For example, with reference to FIG. 5, risk level determiner 508 generates risk level 522 based on cumulative length of time 524, characteristic descriptor(s) 514 (e.g., comprising configuration setting(s)), and/or vulnerability score 520.

At step 410, an action to mitigate the determined vulnerability is performed in accordance with the security risk level. For example, with reference to FIG. 5, action mitigator 510 performs an action to mitigate the determined vulnerability accordance with security risk level 522.

In accordance with one or more embodiments, performing the action to mitigate the determined vulnerability in accordance with the security risk level comprises at least one of providing a notification specifying the security risk level for the instances of the software application, displaying the security risk level for the instances of the software application via user interface, providing a first command to each of the plurality of second computing devices that causes an update to be installed for the instances of the software applications that patches the vulnerability, providing a second command to each of the plurality of second computing devices that causes one or more configuration settings to be changed for the instances of the software application that mitigates the vulnerability, or providing a third command to each of the plurality of second computing devices that causes the instances of the software applications to be uninstalled. For example, with reference to FIG. 5, action mitigator 510 may provide a notification (e.g., a short message service (SMS) message, a telephone call, an e-mail, a notification that is provided to a third-party reporting service, etc.), specifying the security risk level for the instances of the software application, cause the security risk level for the instances of the software application to be displayed via a user interface (e.g., graphical user interfaces 200 or 300, as shown in FIGS. 2 and 3), automatically provide a command 526 to second computing device(s) 104A-104C that causes an update to be installed for the instances of the software applications that patches the vulnerability, causes one or more configuration settings to be changed for the instances of the software application that mitigates the vulnerability, or causes the instances of the software applications to be uninstalled.

Figure 6:
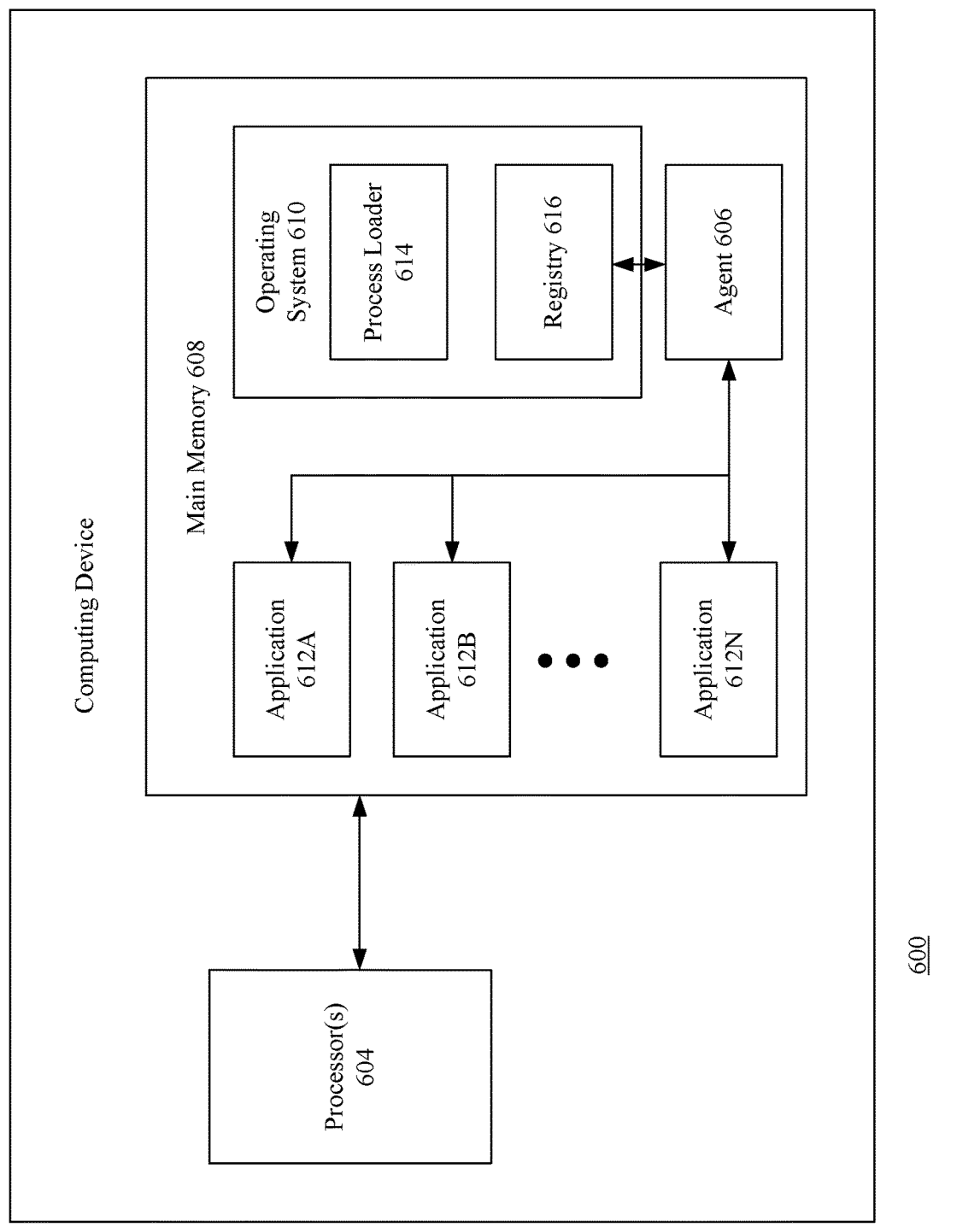
FIG. 6 depicts a block diagram of a computing device comprising an agent in accordance with an embodiment described herein.

FIG. 6 depicts a block diagram of a computing device 600 comprising an agent 606 in accordance with an embodiment described herein. Computing device 600 is an example of computing devices 102A-102N, as described above with reference to FIG. 1. As shown in FIG. 6, computing device 600 comprises one or more processors 604 (also referred to central processing units (CPUs)) and a primary or main memory 608, which are communicatively coupled, for example, via one or more communication buses. In some embodiments, processor(s) 102 can simultaneously operate multiple computing threads, and in some embodiments, processor(s) 102 may each comprise one or more processor core(s). Examples of main memory 104 include a random access memory (RAM) (e.g., dynamic RAM (DRAM), synchronous DRAM (SDRAM), dual-data rate RAM (DDR-RAM), etc.).

As also shown in FIG. 6, main memory 608 stores agent 606, an operating system 610, and one or more applications 612A-612N. Operating system 610 may manage one or more hardware components (e.g., processor(s) 604, main memory 608, etc.) and software (e.g., applications 612A-612N) executing on computer device 600. Example hardware components of computer system 600 are described in detail below in reference to FIG. 8.

Operating system 610 may have one or more components that perform certain tasks relating to the execution of software on computer system 600. One such component is process loader 614. Process loader 614 is configured to initiate creation of a computing process (or "process") in main memory 608. The process is an instance of a computer program being executed by processor(s) 604. The computer program may comprise an application program (or "application") (e.g., applications 612A-612N), a component of the application program (e.g., a plug-in, an add-on, a dynamic linked library, etc.), a system program, or other computer program being executed by processor(s) 604. Each of applications 612A-612N is representative of a computing process. The computer program is embodied in instructions and/or data included in a binary image.

To initiate creation of a process, process loader 614 may load (or "map") a binary image (e.g., stored in one or more secondary storage device (not shown) of computing device 600) into an address space allocated for the process in main memory 608 based on information included in the binary image. Process loader 614 builds up an initial execution context of each process. Computer program execution begins when processor(s) 604 commence executing the first instruction of the computer program. Each process may comprise one or more threads of execution that execute a subset of instructions concurrently.

As the program execution evolves, other component(s) of operating system 610 allocate various resources to a process. The execution context of a process may comprise information about such resource allocation, a current state of the program execution, an instruction that is to be executed next, and other information related to the program execution. The computer program execution continues until processor(s) 604 execute a termination or halt instruction.

As further shown in FIG. 6, operating system 610 further comprises a registry 616. Registry 616 may comprise a hierarchical database that stores settings for operating system 610 and for applications (e.g., applications 612A-612N) that opt to use registry 616.

Agent 606 may be configured to determine various characteristics of active software (e.g., applications 612A-612N (and/or components thereof, e.g., application plug-ins, application add-ons, dynamic linked libraries, third-party libraries, modules, etc.), operating system 610, etc.) executing on computing device 600 (rather than merely determining characteristics of software (or software objects) installed on thereon). Examples of characteristics include, but are not limited to, how frequent application(s) 612A-612N are being utilized on computing device 600, how long application(s) 612A-612N are being run (or executed) on a respective computing device, settings of application(s) 612A-612N, execution domain and local privileges associated with application(s) 612A-612N, whether application(s) 612A-612N are public-facing (i.e., accessible via a network and/or the Internet), etc.

Agent 606 may also be configured to determine settings of applications 612A-612N and/or operating system 610. For instance, agent 606 may provide query registry 616, which returns settings for applications 612A-612N and/or operating system 610. Alternatively, agent 606 may query applications 612A-612N directly for their respective configuration settings. For instance, each of applications 612A-612N may expose an application programming interface (API). Agent 606 may provide a query to the API of a particular application of applications 612A-612N for the settings thereof. Examples of settings include, but are not limited to, network settings, firewall settings, administrative settings, encryption settings, etc. For instance, agent 606 may determine whether a firewall application or service is activated or deactivated. In another example, agent 606 may determine whether a particular network protocol (of operating system 610, application(s) 612A-612N, or a service) that is exploitable via malware is activated (e.g., a server message block (SMB) version 1 protocol). In yet another example, agent 606 may determine whether operating system 610 enables execution of an application installed on an external storage device (e.g., a universal serial bus (USB) drive). In a further example, agent 606 may determine whether network level authentication is activated for a particular application of applications 612A-612N, e.g., a remote desktop protocol (RDP) application. In another example, agent 606 may determine whether encryption is enabled with respect to certain storage devices included in computing device 600. In a further example, agent 606 may determine a permission level set for an active and executing user access control mechanism of operating system 610.

To determine how frequent application(s) 612A-612N and/or how long application(s) 612A-612N execute on computing device 600, agent 606 may monitor operations performed with respect to process loader 614. For instance, agent 606 may be configured to monitor process loader 614 to determine when processes are loaded into memory 608, thereby indicating the initiation of execution of application(s) 612A-612N. Agent 606 may also monitor when processes are terminated, thereby indicating the end of execution of application(s) 612A-612N. Agent 606 may determine the length of the run time of application(s) 612A-612N based on the foregoing monitoring techniques. For instance, agent 606 may initiate a counter when a process corresponding to a particular application of application(s) 612A-612N is initiated and halt the counter when the process is terminated. In another example, agent 606 may obtain a first timestamp at which a process corresponding to a particular application of application(s) 612A-612N is initiated and a second timestamp at which the process is suspended and/or terminated. Agent 606 may determine the difference between the first and second timestamps. The difference corresponds to the length of time that the application executed on computing device 600. To determine the frequency of a particular application of application(s) 612A-612N usage in a given time frame (e.g., per day, per week, per month, or any other periodic time frame), agent 606 may track the number of times the application is loaded into main memory 608. It is noted that the techniques described above to determine how long and how frequent application(s) 612A-612N execute on computing device 600 are purely exemplary and that other techniques may be utilized.

Agent 606 is also configured to provide descriptors of such characteristics to computing device 102 (as described above with reference to FIGS. 1 and 5), along with additional information or characteristics. The additional information includes, but is not limited to, an identifier of each piece of software (e.g., applications 612A-612N) being profiled, an identifier of computing device 600, an identifier of the type of computing device 600 (e.g., a server, a workstation, etc.), etc.

Agent 606 may continuously monitor computing device 600 to determine which pieces of software are active and executing thereon at any given time and to determine characteristics for such software. This way, all pieces of software that execute on the computing device 600 are eventually profiled even though each piece may not necessarily execute at the same time. Agent 606 may periodically provide the descriptors for the determined characteristics to computing device 102. For instance, agent 106 may provide the descriptors for the determined characteristics to computing device 102 on an hourly basis, a daily basis, a weekly basis, and/or in accordance with any other periodic time frame. Alternatively, computing device 102 requests the determined characteristics and/or other information from agent 606.

Accordingly, an agent may determine various characteristics of application(s) that executed on a computing device in many ways. For example, FIG. 7 depicts a flowchart 700 of an example method performed by an agent of a computing device for determining various characteristics of application(s) that executed on a computing device in accordance with an example embodiment. In an embodiment, flowchart 700 may be implemented by agent 606 of computing device 600 of FIG. 6. Accordingly, the method of flowchart 700 will be described with continued reference to computing device 600 of FIG. 6, although the method is not limited to that implementation. Other structural and operational embodiments will be apparent to persons skilled in the relevant art(s) based on the discussion regarding flowchart 700 and computing device 600 of FIG. 6.

As shown in FIG. 7, the method of flowchart 700 begins at step 702. In step 702, operations of a process loader of an operating system are monitored to determine, for each of a plurality of applications installed on a first computing device, a first characteristic indicative of at least a length of time that the application executed on the first computing device. For example, with reference to FIG. 6, agent 606 monitors operations process loader 614 of operating system 610 to determine, for each of applications 612A-612N, a first characteristic indicative of at least a length of time that the application executed on computing device 600.

For instance, agent 606 may be configured to monitor process loader 614 to determine when processes are loaded into memory 608, thereby indicating the initiation of execution of application(s) 612A-612N. Agent 606 may also monitor when processes are terminated, thereby indicating the end of execution of application(s) 612A-612N.

In step 704, for each of the plurality of applications, at least a second characteristic of the application, is determined. For example, with reference to FIG. 6, agent 606 determines, for each of applications 612A-612N, at least a second characteristic of the application.

For example, the second characteristics may include, but are not limited to, an identifier of applications 612A-612N, an identifier of computing device 600, an identifier of the type of computing device 600 (e.g., a server, a workstation, etc.), how frequent application(s) 612A-612N are being utilized on computing device 600, configuration settings of application(s) 612A-612N, execution domain and local privileges associated with application(s) 612A-612N, whether application(s) 612A-612N are public-facing (i.e., accessible via a network and/or the Internet), etc. Examples of settings include, but are not limited to, network settings, firewall settings, administrative settings, encryption settings, etc.

In step 706, at least a first descriptor of the first characteristic and a second descriptor of the second characteristic determined for each of the plurality of applications are provided to a second computing device. For example, with reference to FIG. 6, agent 606 may provide at least a descriptor of the first characteristic and a descriptor of the second characteristic determined for each of applications 612A-612N are provided to a computing device (e.g., computing device 102, as described above with reference to FIGS. 1 and 5).

III. Example Computer System Implementation

Figure 8:
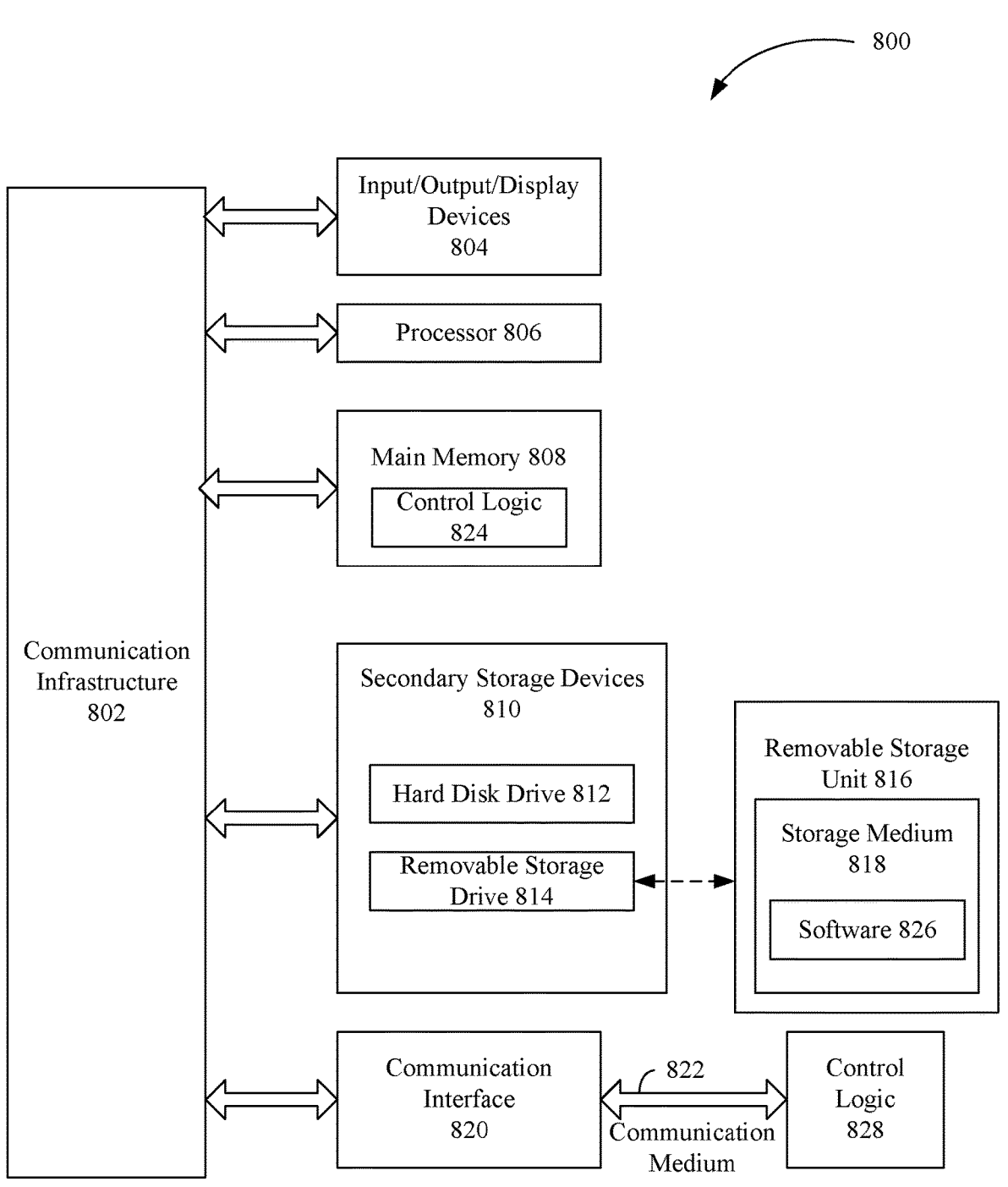
FIG. 8 depicts a block diagram of a computer system that may be configured to perform techniques disclosed herein.

The embodiments described herein, including systems, methods/processes, and/or apparatuses, may be implemented using well known processing devices, servers, smart phones, tablets, personal data assistants (PDAs), Internet-of-Things (IoT) devices, computers, etc. such as a computer 800 shown in FIG. 8. It should be noted that computer 800 may represent computing devices linked to, processing devices, traditional computers, and/or the like in one or more embodiments. For example, system 100 of FIG. 1, graphical user interfaces 200 and 300, system 500 of FIG. 5, computing device 600 of FIG. 6, and any of the sub-systems, components, and/or models respectively contained therein and/or associated therewith, and/or flowcharts 400 and/or 700 of FIGS. 4 and 7 may be implemented using one or more computers 800.

Computer 800 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 800 may be any type of computer, including a desktop computer, a server, a mobile device (e.g., a tablet, a personal data assistant (PDA), a smart phone, a laptop, etc.), an IoT device, etc.

Computer 800 includes one or more processors (also called central processing units, or CPUs), such as a processor 806. Processor 806 is connected to a communication infrastructure 802, such as a communication bus. In some embodiments, processor 806 can simultaneously operate multiple computing threads, and in some embodiments, processor 806 may comprise one or more processors.

Computer 800 also includes a primary or main memory 808, such as random access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Computer 800 also includes input/output/display devices 804, such as touchscreens, LED and LCD displays, monitors, keyboards, pointing devices, etc.

Computer 800 further includes a communication or network interface 820. Communication interface 820 enables computer 800 to communicate with remote devices. For example, communication interface 820 allows computer 800 to communicate over communication networks or mediums 822 (representing a form of a computer useable or readable medium), such as LANs, WANs, the Internet, etc. Network interface 820 may interface with remote sites or networks via wired or wireless connections.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments.

Techniques, including methods, and embodiments described herein (e.g., system 100 of FIG. 1, graphical user interfaces 200 and 300, system 500 of FIG. 5, computing device 600 of FIG. 6, and any of the sub-systems, components, and/or models respectively contained therein and/or associated therewith, and/or flowcharts 400 and/or 700 of FIGS. 4 and 7) may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 806 of FIG. 8), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

IV. Additional Exemplary Embodiments

A method performed by a first computing device is described herein. The method includes: for each of a plurality of second computing devices communicatively coupled to the first computing device, receiving, from the second computing device; a first characteristic descriptor indicating a length of time that an instance of a software application executed on the second computing device; and a second characteristic descriptor of the instance of the software application: determining a cumulative length of time that the instances of the software application executed on the plurality of second computing devices in a predetermined time frame; determining that a vulnerability exists with respect to the instances of the software application executing on the plurality of second computing devices based on the second characteristic descriptor; assigning a security risk level to the instances of the software application based at least on the determined vulnerability and the cumulative length of time; and performing an action to mitigate the determined vulnerability in accordance with the security risk level.

In an implementation of the method, the second characteristic descriptor of the instance of the software application one or more properties of the instance of the software application.

In an implementation of the method, further comprising: for each of the plurality of second computing devices, receiving, from the second computing device a third characteristic descriptor specifying one or more configuration settings of the instance of the software application.

In an implementation of the method, assigning the security risk level is further based on the one or more configuration settings of the instances of the software application.

In an implementation of the method, the one or more configuration settings of the instance of the software application comprises at least one of: one or more firewall settings of the instance of the software application; one or more administrative settings of the instance of the software application; or one or more encryption settings of the instance of the software application.

In an implementation of the method, performing the action to mitigate the determined vulnerability in accordance with the security risk level comprises at least one of: providing a notification specifying the security risk level for the instances of the software application; displaying the security risk level for the instances of the software application via a user interface; providing a first command to each of the plurality of second computing devices that causes an update to be installed for the instances of the software applications that patches the vulnerability; providing a second command to each of the plurality of second computing devices that causes one or more configuration settings to be changed for the instances of the software application that mitigates the vulnerability; or providing a third command to each of the plurality of second computing devices that causes the instances of the software applications to be uninstalled.

In an implementation of the method, assigning the security risk level is further based on at least one of: a number of the plurality of second computing devices on which the instances of the software application executed; a frequency at which the instances of the software application is executed on the plurality of second computing devices; a device type of each of the plurality of second computing devices; or a type of a user of each of the plurality of second computing devices.

A system in also described herein. The system includes: one or more processing units; and a memory coupled to the one or more processing units, the memory storing program code for execution by the one or more processing units, the program code comprising: a vulnerability assessment engine configured to: for each of a plurality of computing devices communicatively coupled to the system, receive, from the computing device; a first characteristic descriptor indicating a length of time that an instance of a software application executed on the computing device; and a second characteristic descriptor of the instance of the software application: determine a cumulative length of time that the instances of the software application executed on the plurality of computing devices in a predetermined time frame; determine that a vulnerability exists with respect to the instances of the software application executing on the plurality of computing devices based on the second characteristic descriptor; assign a security risk level to the instances of the software application based at least on the determined vulnerability and the cumulative length of time; and perform an action to mitigate the determined vulnerability in accordance with the security risk level.

In an implementation of the system, the second characteristic descriptor of the instance of the software application specifies one or more properties of the instance of the software application.

In an implementation of the system, the vulnerability assessment engine is further configured to: for each of the plurality of computing devices, receive, from the computing device a third characteristic descriptor specifying one or more configuration settings of the instance of the software application.

In an implementation of the system, the vulnerability assessment engine is further configured to assign the security risk level is based on the one or more configuration settings of the instances of the software application.

In an implementation of the system, the one or more configuration settings of the instance of the software application comprises at least one of: one or more firewall settings of the instance of the software application; one or more administrative settings of the instance of the software application; or one or more encryption settings of the instance of the software application.

In an implementation of the system, the vulnerability assessment engine is configured to perform the action to mitigate the determined vulnerability in accordance with the security risk level by performing at least one of: providing a notification specifying the security risk level for the instances of the software application; displaying the security risk level for the instances of the software application via a user interface; providing a first command to each of the plurality of computing devices that causes an update to be installed for the instances of the software applications that patches the vulnerability; providing a second command to each of the plurality of computing devices that causes one or more configuration settings to be changed for the instances of the software application that mitigates the vulnerability; or providing a third command to each of the plurality of computing devices that causes the instances of the software applications to be uninstalled.

In an implementation of the system, the vulnerability assessment engine is further configured to assign the security risk level based on at least one of: a number of the plurality of computing devices on which the instances of the software application executed; a frequency at which the instances of the software application is executed on the plurality of computing devices; a device type of each of the plurality of computing devices; or a type of a user of each of the plurality of computing devices.

A computer-readable storage medium having program instructions recorded thereon that, when executed by a processor of a first computing device, perform a method. The method includes: for each of a plurality of second computing devices communicatively coupled to the first computing device, receiving, from the second computing device; a first characteristic descriptor indicating a length of time that an instance of a software application executed on the second computing device; and a second characteristic descriptor of the instance of the software application: determining a cumulative length of time that the instances of the software application executed on the plurality of second computing devices in a predetermined time frame; determining that a vulnerability exists with respect to the instances of the software application executing on the plurality of second computing devices based on the second characteristic descriptor; assigning a security risk level to the instances of the software application based at least on the determined vulnerability and the cumulative length of time; and performing an action to mitigate the determined vulnerability in accordance with the security risk level.

In an implementation of the computer-readable storage medium, the second characteristic descriptor of the instance of the software application specifies one or more properties of the instance of the software application.

In an implementation of the computer-readable storage medium, the method further comprises: for each of the plurality of second computing devices, receiving, from the second computing device a third characteristic descriptor specifying one or more configuration settings of the instance of the software application.

In an implementation of the computer-readable storage medium, assigning the security risk level is further based on the one or more configuration settings of the instances of the software application.

In an implementation of the computer-readable storage medium, performing the action to mitigate the determined vulnerability in accordance with the security risk level comprises at least one of: providing a notification specifying the security risk level for the instances of the software application; displaying the security risk level for the instances of the software application via a user interface; providing a first command to each of the plurality of second computing devices that causes an update to be installed for the instances of the software applications that patches the vulnerability; providing a second command to each of the plurality of second computing devices that causes one or more configuration settings to be changed for the instances of the software application that mitigates the vulnerability; or providing a third command to each of the plurality of second computing devices that causes the instances of the software applications to be uninstalled.

In an implementation of the computer-readable storage medium, assigning the security risk level is further based on at least one of: a number of the plurality of second computing devices on which the instances of the software application executed; a frequency at which the instances of the software application is executed on the plurality of second computing devices; a device type of each of the plurality of second computing devices; or a type of a user of each of the plurality of second computing devices.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A method performed by a first computing device, comprising:
    receiving, from each of a plurality of second computing devices communicatively coupled to the first computing device:

a first characteristic descriptor indicating a length of time that an instance of a software application executed on the computing device; and a second characteristic descriptor of the instance of the software application;

determining, based on a respective first characteristic descriptor received from each of the plurality of second computing devices, a cumulative length of time that the instances of the software application executed on the plurality of second computing devices in a predetermined time frame;

obtaining, based on the second characteristic descriptor, a vulnerability score for the instance of the software application, wherein the vulnerability score indicates that a vulnerability exists for the instance of the software application;

assigning a security risk level to the instances of the software application based at least on the vulnerability score and the cumulative length of time; and performing an action to mitigate the determined vulnerability in accordance with the security risk level.

2. The method of claim 1, wherein the second characteristic descriptor of the instance of the software application specifies one or more properties of the instance of the software application.

3. The method of claim 1, further comprising:

for each of the plurality of second computing devices, receiving, from the second computing device a third characteristic descriptor specifying one or more configuration settings of the instance of the software application.

4. The method of claim 3, wherein assigning the security risk level is further based on the one or more configuration settings of the instances of the software application.

5. The method of claim 3, wherein the one or more configuration settings of the instance of the software application comprises at least one of:

one or more firewall settings of the instance of the software application;

one or more administrative settings of the instance of the software application; or one or more encryption settings of the instance of the software application.

6. The method of claim 1, performing the action to mitigate the determined vulnerability in accordance with the security risk level comprises at least one of:

providing a notification specifying the security risk level for the instances of the software application;

displaying the security risk level for the instances of the software application via a user interface;

providing a first command to each of the plurality of second computing devices that causes an update to be installed for the instances of the software applications that patches the vulnerability;

providing a second command to each of the plurality of second computing devices that causes one or more configuration settings to be changed for the instances of the software application that mitigates the vulnerability; or providing a third command to each of the plurality of second computing devices that causes the instances of the software applications to be uninstalled.

7. The method of claim 1, wherein assigning the security risk level is further based on at least one of:

a number of the plurality of second computing devices on which the instances of the software application executed;

a frequency at which the instances of the software application is executed on the plurality of second computing devices;

a device type of each of the plurality of second computing devices; or a type of a user of each of the plurality of second computing devices.

8. A system, comprising:

one or more processing units; and a memory coupled to the one or more processing units, the memory storing program code for execution by the one or more processing units, the program code comprising:

a vulnerability assessment engine configured to:

receive, from each of a plurality of second computing devices communicatively coupled to the system:

a first characteristic descriptor indicating a length of time that an instance of a software application executed on the computing device; and a second characteristic descriptor of the instance of the software application;

determine, based on a respective first characteristic descriptor received from each of the plurality of computing devices, a cumulative length of time that the instances of the software application executed on the plurality of computing devices in a predetermined time frame;

obtain, based on the second characteristic descriptor, a vulnerability score for the instance of the software application, wherein the vulnerability score indicates that a vulnerability exists for the instance of the software application;

assign a security risk level to the instances of the software application based at least on the vulnerability score and the cumulative length of time; and perform an action to mitigate the determined vulnerability in accordance with the security risk level.

9. The system of claim 8, wherein the second characteristic descriptor of the instance of the software application specifies one or more properties of the instance of the software application.

10. The system of claim 8, wherein the vulnerability assessment engine is further configured to:

for each of the plurality of computing devices, receive, from the computing device a third characteristic descriptor specifying one or more configuration settings of the instance of the software application.

11. The system of claim 10, wherein the vulnerability assessment engine is further configured to assign the security risk level is based on the one or more configuration settings of the instances of the software application.

12. The system of claim 10, wherein the one or more configuration settings of the instance of the software application comprises at least one of:

one or more firewall settings of the instance of the software application;

one or more administrative settings of the instance of the software application; or one or more encryption settings of the instance of the software application.

13. The system of claim 8, wherein the vulnerability assessment engine is configured to perform the action to mitigate the determined vulnerability in accordance with the security risk level by performing at least one of:

providing a notification specifying the security risk level for the instances of the software application;

displaying the security risk level for the instances of the software application via a user interface;

providing a first command to each of the plurality of computing devices that causes an update to be installed for the instances of the software applications that patches the vulnerability;

providing a second command to each of the plurality of computing devices that causes one or more configuration settings to be changed for the instances of the software application that mitigates the vulnerability; or providing a third command to each of the plurality of computing devices that causes the instances of the software applications to be uninstalled.

14. The system of claim 8, wherein the vulnerability assessment engine is further configured to assign the security risk level based on at least one of:

a number of the plurality of computing devices on which the instances of the software application executed;

a frequency at which the instances of the software application is executed on the plurality of computing devices;

a device type of each of the plurality of computing devices; or a type of a user of each of the plurality of computing devices.

15. A computer-readable storage medium having program instructions recorded thereon that, when executed by a processor of a first computing device, perform a method, the method comprising:

receiving, from each of a plurality of second computing devices communicatively coupled to the first computing device:

a first characteristic descriptor indicating a length of time that an instance of a software application executed on the second computing device; and a second characteristic descriptor of the instance of the software application;

determining, based on a respective first characteristic descriptor received from each of the plurality of second computing devices, a cumulative length of time that the instances of the software application executed on the plurality of second computing devices in a predetermined time frame;

obtaining, based on the second characteristic descriptor, a vulnerability score for the instance of the software application, wherein the vulnerability score indicates that a vulnerability exists for the instance of the software application;

assigning a security risk level to the instances of the software application based at least on the vulnerability score and the cumulative length of time; and performing an action to mitigate the determined vulnerability in accordance with the security risk level.

16. The computer-readable storage medium of claim 15, wherein the second characteristic descriptor of the instance of the software application specifies one or more properties of the instance of the software application.

17. The computer-readable storage medium of claim 15, the method further comprising:

for each of the plurality of second computing devices, receiving, from the second computing device a third characteristic descriptor specifying one or more configuration settings of the instance of the software application.

18. The computer-readable storage medium of claim 17, assigning the security risk level is further based on the one or more configuration settings of the instances of the software application.

19. The computer-readable storage medium of claim 15, wherein performing the action to mitigate the determined vulnerability in accordance with the security risk level comprises at least one of:

providing a notification specifying the security risk level for the instances of the software application;

displaying the security risk level for the instances of the software application via a user interface;

providing a first command to each of the plurality of second computing devices that causes an update to be installed for the instances of the software applications that patches the vulnerability;

providing a second command to each of the plurality of second computing devices that causes one or more configuration settings to be changed for the instances of the software application that mitigates the vulnerability; or providing a third command to each of the plurality of second computing devices that causes the instances of the software applications to be uninstalled.

20. The computer-readable storage medium of claim 15, wherein assigning the security risk level is further based on at least one of:

a number of the plurality of second computing devices on which the instances of the software application executed;

a frequency at which the instances of the software application is executed on the plurality of second computing devices;

a device type of each of the plurality of second computing devices; or a type of a user of each of the plurality of second computing devices.

* * * * *